United States Patent [19]

Skotheim et al.

[11] Patent Number: 5,362,493
[45] Date of Patent: Nov. 8, 1994

[54] PREPARATION OF REDOX POLYMER CATHODES FOR THIN FILM RECHARGEABLE BATTERIES

[75] Inventors: Terje A. Skotheim, Shoreham; Hung S. Lee, Rocky Point, both of N.Y.; Yoshiyuki Okamoto, Fort Lee, N.J.

[73] Assignee: Associated Universities, Inc., Washington, D.C.

[21] Appl. No.: 913,412

[22] Filed: Jul. 15, 1992

Related U.S. Application Data

[63] Continuation-in-part of Ser. No. 723,059, Jun. 28, 1991, abandoned, which is a continuation-in-part of Ser. No. 519,429, May 4, 1990, abandoned.

[51] Int. Cl.$^5$ .................. H01M 4/04; H01M 4/60
[52] U.S. Cl. ............................. 429/194; 429/213; 252/182.1
[58] Field of Search ............... 429/192, 213; 252/62.2, 252/182.1

[56] References Cited

U.S. PATENT DOCUMENTS

| | | | |
|---|---|---|---|
| 4,375,427 | 3/1985 | Miller et al. | 252/512 |
| 4,496,638 | 1/1985 | Sugiuchi et al. | 429/192 |
| 4,556,617 | 12/1985 | Kruger | 429/196 |
| 4,589,197 | 5/1986 | North | 29/623 |
| 4,654,279 | 3/1987 | Bauer et al. | 429/192 |
| 4,664,991 | 5/1987 | Perichaud et al. | 429/194 |
| 4,720,910 | 1/1988 | Rourke et al. | 429/191 |
| 4,734,343 | 3/1888 | Bertner et al. | 429/192 |
| 4,737,422 | 4/1988 | Knight et al. | 429/192 |
| 4,798,773 | 1/1989 | Yasukawa et al. | 429/192 |
| 4,822,701 | 4/1989 | Ballard et al. | 429/192 |
| 4,830,939 | 5/1989 | Lee et al. | 429/192 |
| 4,865,930 | 9/1989 | Kindler et al. | 429/192 |
| 4,906,718 | 3/1990 | Gornowicz et al. | 528/15 |
| 4,933,053 | 6/1990 | Tieke | 204/59 R |

OTHER PUBLICATIONS

Liu, et al., "All-Solid State Thin-Film Rechargeable Lithium Batteries Using Solid Redox Polymerization Electrodes", Proc. ECS Mtg, Miami, 1989 (month unavailable).

Tsuchida, et al., "Single-Ion Conduction in Poly[(oligo(oxyethylene)-methacrylate)-co-(alkali-metal-Methacrylates)]", American Chemical Society, 1988 (month unavailable).

*Primary Examiner*—Stephen Kalafut
*Attorney, Agent, or Firm*—Margaret C. Bogosian

[57] ABSTRACT

The present invention relates to the manufacture of thin film solid state electrochemical devices using composite cathodes comprising a redox polymer capable of undergoing oxidation and reduction, a polymer solid electrolyte and conducting carbon. The polymeric cathode material is formed as a composite of radiation crosslinked polymer electrolytes and radiation crosslinked redox polymers based on polysiloxane backbones with attached organosulfur side groups capable of forming sulfur-sulfur bonds during electrochemical oxidation.

7 Claims, No Drawings

PREPARATION OF REDOX POLYMER CATHODES FOR THIN FILM RECHARGEABLE BATTERIES

This was made with Government support under contract number DE-AC02-76CH00016, between the U.S. Department of Energy and Associated Universities, Inc. The Government has certain rights in the invention.

RELATED APPLICATIONS

This application is a continuation-in-part application of co-pending application Ser. No. 723,059, filed Jun. 28, 1991, and now abandoned, which in turn is a continuation-in-part of application Ser. No. 519,429, filed May 4, 1990 and now abandoned.

BACKGROUND OF THE INVENTION

The present invention relates to the manufacture of thin film solid state electrochemical devices using solvent-free polymerization of polymer solid electrolytes and redox polymer cathode materials.

Solvent-free polymer electrolytes have generated significant interest in recent years, primarily due to the potential for producing thin film rechargeable lithium batteries with high power capability and energy density. They have been extensively described in the patent literature, e.g. U.S. Pat. Nos. 4,303,748 to Armand, et al.; 4,589,197 to North; 4,547,440 to Hooper, et al.; 4,906,718 to Gornowicz, et al. and 4,228,226 to Christiansen. The cells are construed from an alkali metal foil anode, an ionically conducting polymer solid electrolyte containing an alkali metal foil anode, an ionically conducting polymer solid electrolyte containing an alkali metal salt, and a cathode consisting of a composite of a powdered insertion material, such as $TiS_2$, the polymer electrolyte and an electron conductor, such as finely dispersed carbon black. Like liquid electrolytes and solvent-swollen polyelectrolytes used in ion-exchange resins, solvent-free polymer electrolytes possess ion transport properties. Both cation transport and anion transport in these solid polymer electrolytes have been substantiated and are well documented in the prior art.

In applications of solid polymer electrolytes to secondary solid state batteries, it would be preferable to have no anion migration, the result of which is less polarization and higher power output. Anion mobility produces a negative effect on the energy efficiency of the battery because it results in local concentration gradients which result in deleterious polarization of the cell, lowering the output current.

Attempts have been made to immobilize the anion on the polymer chain in order to achieve specific cationic conductivity. Several approaches have included the synthesis of cationic single-ionic conductors based on carboxylate or sulfonate salts. (Tsuchida et al, Macromolecules 21,96(1988)). These reported electrolytes are limited in their application due to low conductivity. Presumably, the low conductivity is due to the extensive ion pairing in these salts. High conductivity polymer solid electrolytes with specific cation conductivity have been synthesized by Skotheim et al (U.S. Pat. No. 4,882,243 (1989)) where the immobilized anionic moieties are based on sterically hindered phenol compounds. Sterically hindered phenol substituted polysiloxanes have demonstrated specific cation conductivity 100–1000 times higher than what has been previously achieved with covalently attached carboxylate or sulfonate salts.

Polymer solid electrolytes are generally cast from a common organic solvent for the polymer and the alkali metal salts, such as methanol or acetonitrile. Disposing of the organic solvent poses an environmental hazard and adds a considerable manufacturing cost. It would be preferable to synthesize the polymer electrolyte using a solvent-free polymerization method where the polymerization is performed under actinic irradiation. Actinic irradiation is defined as ultraviolet, gamma ray or electron beam irradiation.

M.-T. Lee et al., U.S. Pat. No. 4.830,939, describes a method for forming an interpenetrating polymeric network for use in solid state electrochemical cells, consisting of a liquid electrolyte trapped in a crosslinked polymer matrix. The two phase polymer electrolyte system is formed by subjecting a mixture consisting of a liquid monomeric or prepolymeric radiation polymerizable compound, a radiation inert ionically conducting compound, such as propylene carbonate (PC), and an alkali metal salt, such as lithium trifluoromethane sulfonate, to actinic radiation to thereby crosslink the radiation polymerizable material and form a solid matrix.

Electrochemically, the composite electrolyte material described by Lee et al. behaves essentially as a liquid electrolyte, with the well known degradation problems associated with liquid electrolytes. The long term stability of liquid electrolyte based electrochemical cells is limited by corrosion at the electrode/electrolyte interface, leading tto the build up of passivating layers on the lithium electrode. In addition, with liquid electrolytes, co-insertion of the solvent and the alkali metal cation, e.g. lithium, into the cathode material results in degradation of the cathode material due to swelling and de-swelling upon discharging and charging of the battery. It would be preferable to use high conductivity polymer electrolytes containing no liquid components.

The cathode materials used in manufacturing of thin flim lithium or sodium batteries have generally been intercalation compounds such as $TiS_2$ and $V_6O_{13}$. The cells have had limited rate capability and low utilization of cathode capacity. The cathode is formed as a composite consisting of powdered intercalation material and the polymer electrolyte with finely dispersed carbon black as electrical conductor. The rate limiting factor is generally the diffusion of cation in the insertion host material. Recently, M. Liu et al (Proc. Electrochem. Soc. Meeting, Miami, Fla., Sep. 1989) have describe a new class of redox polymer based cathode materials with substantially improved rate capability for lithium or sodium secondary batteries. The materials are based on polymerization and depolymerization via sulfur-sulfur bonds during the charging and discharging of the battery. Electrochemical cells were made with lithium foil anode, an electrolyte consisting of polyethylene oxide (PEO) with a lithium salt, such as $LiClO_4$ or $LiSO_3CF_3$, and a cathode consising of a homogeneous mixture of PEO and a redox polymer, with added carbon black for electrical conductivity. The cells demonstrated considerably higher rate capabilities than comparable cells made with $TiS_2$ cathodes.

One drawback with the system described by Liu et al is the reliance on polymerization and depolymerization of the redox cathode. When depolymerized, the monomers could disperse into the polymer electrolyte over time, severly limiting the lifetime of the cell. A second problem arises from the polymer electrolyte and the redox polymer cathode having different polymeric backbones. The miscibility of different polymers is a well known problem. With different polymeric systems, phase segregation normally occurs. Basing the electrolyte and the electrode materials on the same polymeric backbone and employing high conducting single-ion conducting polymer electrolytes would be expected to result in improved long term stability and higher capacity.

SUMMARY OF THE INVENTION

A principal object of the present invention is to provide a method for forming a redox polymer composite cathode for use in solid state electrochemical cells.

Another object of the invention is to provide high conductivity polymer electrolytes with exclusive cation conduction.

Another object of the invention is to provide redox polymer cathode materials with redox properties based on the breaking and reforming of sulfur-sulfur bonds with the disulfide redox moieties covalently attached to polysiloxane backbones.

Another object of the invention is to provide a method for forming a composite redox polymer cathode using actinic irradiation of monomeric and prepolymeric systems.

Another object of the invention is to provide a class of redox polymer cathode materials based on polysiloxane backbones to be miscible with the polysiloxane based polymer electrolytes. The reduction and oxidation is based on the breaking and forming of sulfur-sulfur bonds or groups covalently attached to the polysiloxane backbone. Consequently, no depolymerization occurs. Without de-polymerization, long term stability should be enhanced.

In accordance with the present invention, the electrolyte is formed by radiation crosslinking branched polysiloxanes with ethylene oxide and anionic side groups and radiation polymerizable moieties. The polysiloxane backbone provides high degree of local segmental mobility to assist in the ion motion. The highest conductivities measured for a polymer solid electrolyte has been with branched polysiloxanes. Crosslinking is necessary to provide the requisite mechanical stability to the polymer electrolyte and for the polymer to function as separator.

The radiation polymerizable electrolyte composition may be coated together with an ionizable alkali metal salt, onto the anode or the cathode prior to radiation crosslinking. Exposure to radiation either during or subsequent to deposition produced a branched polysiloxane network with ethylene oxide side groups for cation complexation.

In another embodiment of the invention, anionic groups are attached to the polysiloxane backbone together with ethylene oxide moieties to produce an exclusively cation conducting polymer electrolyte. The anionic groups can be sterically hindered phenol compounds, as described in U.S. Pat. No. 4,882,243.

The composite cathode is formed by preparing a homoseneous mixture of a branched polysiloxane redox polymer cathode material, a branched polysiloxane electrolyte material which may contain covalently attached anoinic moieties, both containing radiation polymerizable moieties, and an ionizable alkali metal salt, and curing the mixture by exposing it to actinic radiation. This produces a polysiloxane network which is a homogeneous mixture of the polymer electrolyte and the polymer redox cathode.

The polymer electrolyte can be coated on an alkali metal foil or evaporated alkali metal film or a lithium-carbon composite film followed by deposition of the polymer composite cathode.

Alternatively, the polymer cathode can be coated first on a current collector, such as nickel or aluminum foil or highly conducting polymer, followed by deposition of the polymer electrolyte and subsequent evaporation of the alkali metal, such as lithium, onto the cured polymer electrolyte, or coating of a lithium-carbon composite film onto the cured polymer electrolyte. These processes can be formed in a continuous deposition system with full automation of the deposition process.

DETAILED DESCRIPTION OF THE INVENTION

The polymer electrolyte network of the present invention is formed from branched polysiloxanes capable of crosslinking to form a network when exposed to actinic radiation. The branched polysiloxanes contain radiation polymerizable groups, such as polethylenically unsaturated moieties. More specifically, the polysiloxanes are selected from the formula:

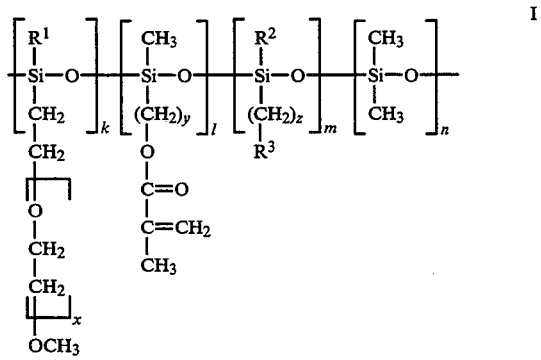

wherein:

$R^1 = -CH_3$ or $-CH_2CH_2(OCH_2CH_2)_xOCH_3$
$R^2 = -CH_3$ or $-(CH_2)_zR^3$
$R^3 = -COO^- M^+$ or $-SO_3^- M^+$ or

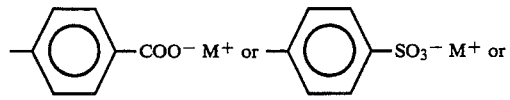

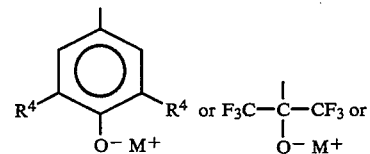

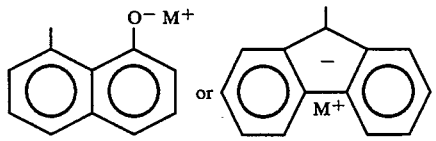

$R^4 = -CH_2CH_3$ or $-CH(CH_3)_2$ or

-continued

—C(CH₃)₃  M+ = Li+ or Na+ or K+ k=0–100, l=0–100, m is at least 2, n=0–100, k+l+m+n is equivalent to a viscosity of up to 1.0 Pa.s, x=3=30, y=2=12, z=2-12 and the molar ratio of CH₂CH₂O units to alkali metal salt is 5–40.

In general, R₃ is an anionic moiety capable of being covalently attached to a polysiloxane backbone.

Ionizable alkali metal salts useful in this invention include lithium and sodium salts where the anions may be selected from the group consisting of ClO₄, SO₃, BF₄, CF₃COO—, PF₆—, N(SO₂CF₃)₂— and SCN—.

The composite cathode materials are made from a mixture of carbon powder, polysiloxane electrolytes and polysiloxane redox polymers selected from the formula:

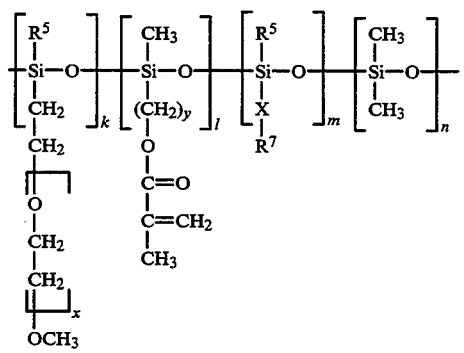

wherein:

$X = -(CH_2)_q$ or $-CH_2CH_2(OCH_2CH_2)_rOCH_2$
$R^5 = -CH_3$ or $-CH_2CH_2(OCH_2CH_2)_xOCH_3$
$R^6 = -CH_3$ or $-X-R^7$

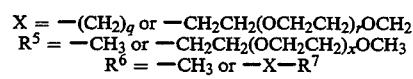

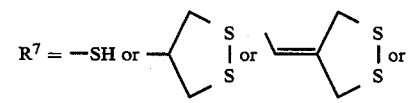

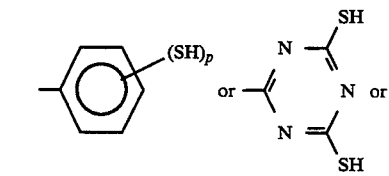

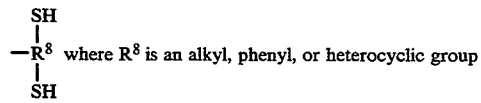

k, l, m, n, x, y, z are defined as above and p=1–3, q=1–10 and r=1–30.

Upon electrochemical reduction, intra- or interpolymeric sulfur-sulfur bonds are formed. The bonds are broken upon electrochemical oxidation, with alkali metal cations inserted as counterions for electrical neutrality. The result is a high concentration of alkali metal cations inserted into the composite cathode.

We claim:

1. A method for forming a composite polymeric cathode material for use in solid state electrochemical cells, which comprises forming a physical mixture of a branched polysiloxane polymer electrolyte, a branched polysiloxane redox polymer, an ionizable alkali metal salt, and conducting carbon powder, said branched polysiloxane polymer electrolyte and branched polysiloxane redox polymer both containing radiation polymerizable, ethylenically unsaturated groups, and subjecting the physical mixture to actinic radiation to form a crosslinked polymer network.

2. A rechargeable battery cell comprising a composite polymeric cathode material produced following the method of claim 1.

3. The method according to claim 1, wherein said actinic radiation is ultraviolet, gamma ray or electron beam radiation.

4. The method according to claim 1, wherein the ionizable alkali metal salt is a lithium or sodium salt and wherein the anionic group is selected from the groups ClO₄—, SO₃—, BF₄—, CF₃—, PF₆—, N(SO₂CF₃)₂— and SCN—.

5. The method according to claim 1, wherein said branched polysiloxane is represented by the formula:

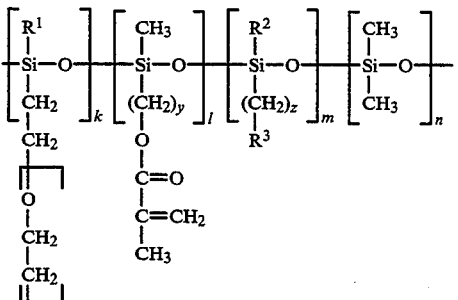

wherein:

$R^1 = -CH_3$ or $-CH_2CH_2(OCH_2CH_2)_xOCH_3$
$R^2 = -CH_3$ or $-(CH_2)_zR^3$
$R^3 = -COO^- M^+$ or $-SO_3^- M^+$ or

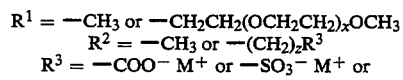

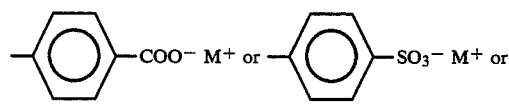

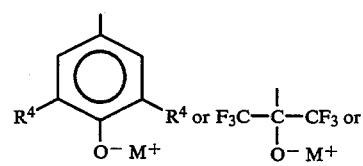

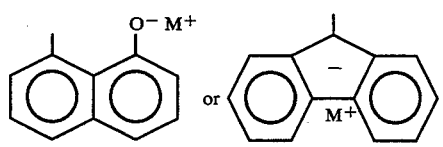

6. The method according to claim 1, wherein the branched polysiloxane redox polymer contains covalently attached organosulfur redox moieties capable of breaking and reforming sulfur-sulfur bonds upon electrochemical reduction and oxidation.

7. The method according to claim 6, wherein the redox polymer is represented by the formula:

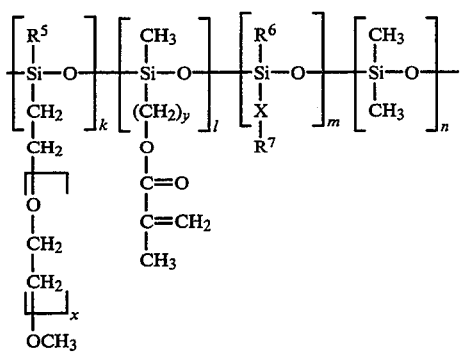
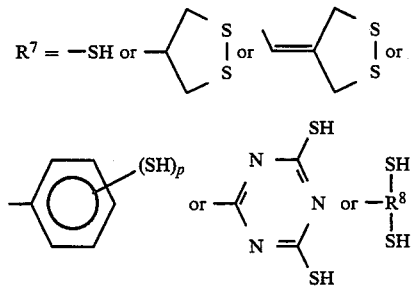
-continued
X = —(CH$_2$)$_q$ or —CH$_2$CH$_2$(OCH$_2$CH$_2$)$_r$OCH$_2$
R$^5$ = —CH$_3$ or —CH$_2$CH$_2$(OCH$_2$CH$_2$)$_x$OCH$_3$
R$^6$ = —CH$_3$ or —X—R$^7$
* * * * *